United States Patent
Elzur

(10) Patent No.: US 7,305,007 B2
(45) Date of Patent: Dec. 4, 2007

(54) RECEIVER-AIDED SET-UP REQUEST ROUTING

(75) Inventor: Uri Elzur, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 977 days.

(21) Appl. No.: 10/331,302

(22) Filed: Dec. 30, 2002

(65) Prior Publication Data

US 2003/0169744 A1 Sep. 11, 2003

Related U.S. Application Data

(60) Provisional application No. 60/362,554, filed on Mar. 7, 2002.

(51) Int. Cl.
*H04L 12/66* (2006.01)
(52) U.S. Cl. .................. 370/463; 370/469; 709/230; 709/238; 709/250
(58) Field of Classification Search ............... 370/463, 370/469
See application file for complete search history.

(56) References Cited

U.S. PATENT DOCUMENTS

| | | | |
|---|---|---|---|
| 6,208,651 B1 | | 3/2001 | Van Renesse et al. |
| 6,247,060 B1 * | 6/2001 | Boucher et al. | 709/238 |
| 6,334,153 B2 * | 12/2001 | Boucher et al. | 709/230 |
| 6,389,479 B1 * | 5/2002 | Boucher et al. | 709/243 |
| 6,591,302 B2 * | 7/2003 | Boucher et al. | 709/230 |
| 6,658,480 B2 * | 12/2003 | Boucher et al. | 709/239 |

OTHER PUBLICATIONS

Strauss P R, "Header Prediction Will Boost Packet Throughput", Data Communications, McGraw Hill, New York, USA, vol. 18 No. 10, Aug. 1, 1989, pp. 41, 44-45, XP000048599 ISSN: 0363-6399.
Waldvogel M et al., "Scalable High Speed IP Routing Lookups", Computer Communication Review, Association for Computing Machinery, New York, USA, Sep. 14, 1997, pp. 25-36, XP002175386 ISSN: 0146-4833.
Reynolds J et al, "RFC 1700 : Assigned Numbers", IETF, Oct. 1994, XP002279110 Internet, pp. 8, 16-17.

\* cited by examiner

*Primary Examiner*—Hassan Kizou
*Assistant Examiner*—Brian T O'Connor
(74) *Attorney, Agent, or Firm*—McAndrews, Held & Malloy, Ltd.

(57) ABSTRACT

Systems and methods that provide receiver-aided set-up request routing are provided. In one embodiment, an incoming packet is received and parsed. A probability is determined that a particular software layer is likely to be a software layer to which the incoming packet is to be connected as a function of information from at least a portion of the parsed packet. The software layer with the highest determined probability is selected.

23 Claims, 4 Drawing Sheets

RECEIVER-AIDED SET-UP REQUEST ROUTING

RELATED APPLICATION

This application makes reference to, claims priority to and claims benefit from U.S. Provisional Patent Application Ser. No. 60/362,554, entitled "Receiver-Aided Set-Up Request Routing" and filed on Mar. 7, 2002.

INCORPORATION BY REFERENCE

The above-referenced United States patent application is hereby incorporated herein by reference in its entirety.

BACKGROUND OF THE INVENTION

The convergence of protocols around the transmission control protocol/internet protocol (TCP/IP) and the convergence of the wires in environments such as data centers give rise to systems providing multiple services. It may be useful to deliver requests to the proper entity inside a receiving system with very limited information about the requested type of service. When a first system wants to connect with a particular software layer in a second system, the second system tests all the software layers in the second system before determining to which software layer the first system wants to connect. Such an exhaustive method may take up valuable time and resources for both systems.

Furthermore, if the first system wishes to make the same connection again in the future, there is no mechanism by which the second system can intelligently connect the first system to the requested software layer. Instead, the conventional second system tests all of the software layers again without regard to previous experiences.

Further limitations and disadvantages of conventional and traditional approaches will become apparent to one of ordinary skill in the art through comparison of such systems with the present invention as set forth in the remainder of the present application with reference to the drawings. Aspects of the present invention may overcome or reduce one or more of the limitations and disadvantages of the conventional and traditional approaches.

BRIEF SUMMARY OF THE INVENTION

Aspects of the present invention may be found in, for example, systems and methods that provide receiver-aided set-up request routing. In one embodiment, the present invention may provide a method that sets up a connection to a software layer. The method may include, for example, one or more of the following: receiving an incoming packet; parsing the received packet; determining a probability that a particular software layer is likely to be a software layer to which the incoming packet is to be connected as a function of information from at least a portion of the parsed packet; and selecting the software layer with the highest determined probability.

In another embodiment, the present invention may provide a system that sets up a connection to a software layer. The system may include, for example, means for receiving an incoming packet; means for parsing the received packet; means for determining a probability that a particular software layer is likely to be a software layer to which the incoming packet is to be connected as a function of information from at least a portion of the parsed packet; and means for selecting the software layer with the highest determined probability.

In yet another embodiment, the present invention may provide a system that sets up a connection to a requested software layer. The system may include, for example, a heuristic module, a hardware module and a software module. The hardware module may be coupled to the heuristic module. The software module may be coupled to the hardware module and may include a plurality of software layers. The hardware module may receive and may parse an incoming data packet. The heuristic module may access the parsed data packet and may determine a most likely requested software layer. The hardware module may test the most likely requested software layer.

These and other features and advantages of the present invention may be appreciated from a review of the following detailed description of the present invention, along with the accompanying figures in which like reference numerals refer to like parts throughout.

DETAILED DESCRIPTION OF THE INVENTION

Figure 1:
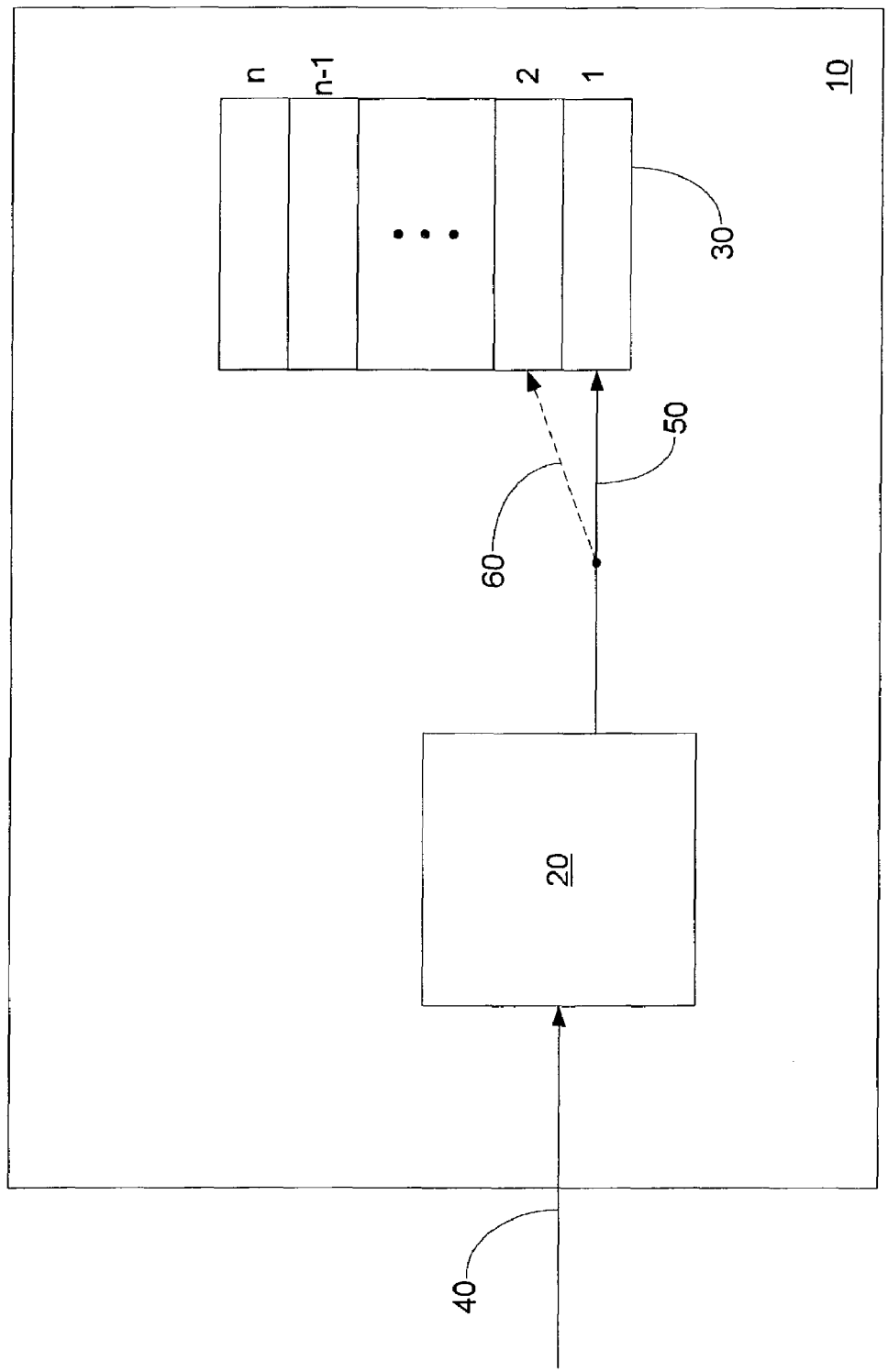
FIG. 1 shows a representation illustrating an embodiment of a system that sets up a connection to a software layer according to the present invention.

FIG. 1 shows an embodiment of a system that sets up a connection to a software layer according to the present invention. The illustrated system 10 includes a hardware module 20 and a software module 30. The software module 30 has an architecture, for example, that includes a plurality of software layers (e.g., layers 1 to n). The hardware module 20 is structured to receive an incoming information packet 40 containing a request for a connection with a software layer and to route the incoming information packet 40 to the appropriate software layer.

In one example, the hardware module 20 tests each software layer until the appropriate layer is found. In the illustrated example, the software layers are stacked from layer 1 to layer n. Accordingly, the hardware module 20 could test layer 1 (as represented by path 50) and, if layer 1 was found not to be the appropriate layer for connection, then hardware module 20 could test layer 2 (as represented by path 60) and so on until the appropriate layer for connection was found. Upon finding the appropriate layer, the hardware module 20 could route the information packet 40 to the appropriate layer. Although the order of testing the software layers was illustrated from the bottom of a stack to the top of a stack, the present invention need not be so restricted in its search for the appropriate layer for connection.

Figure 2:
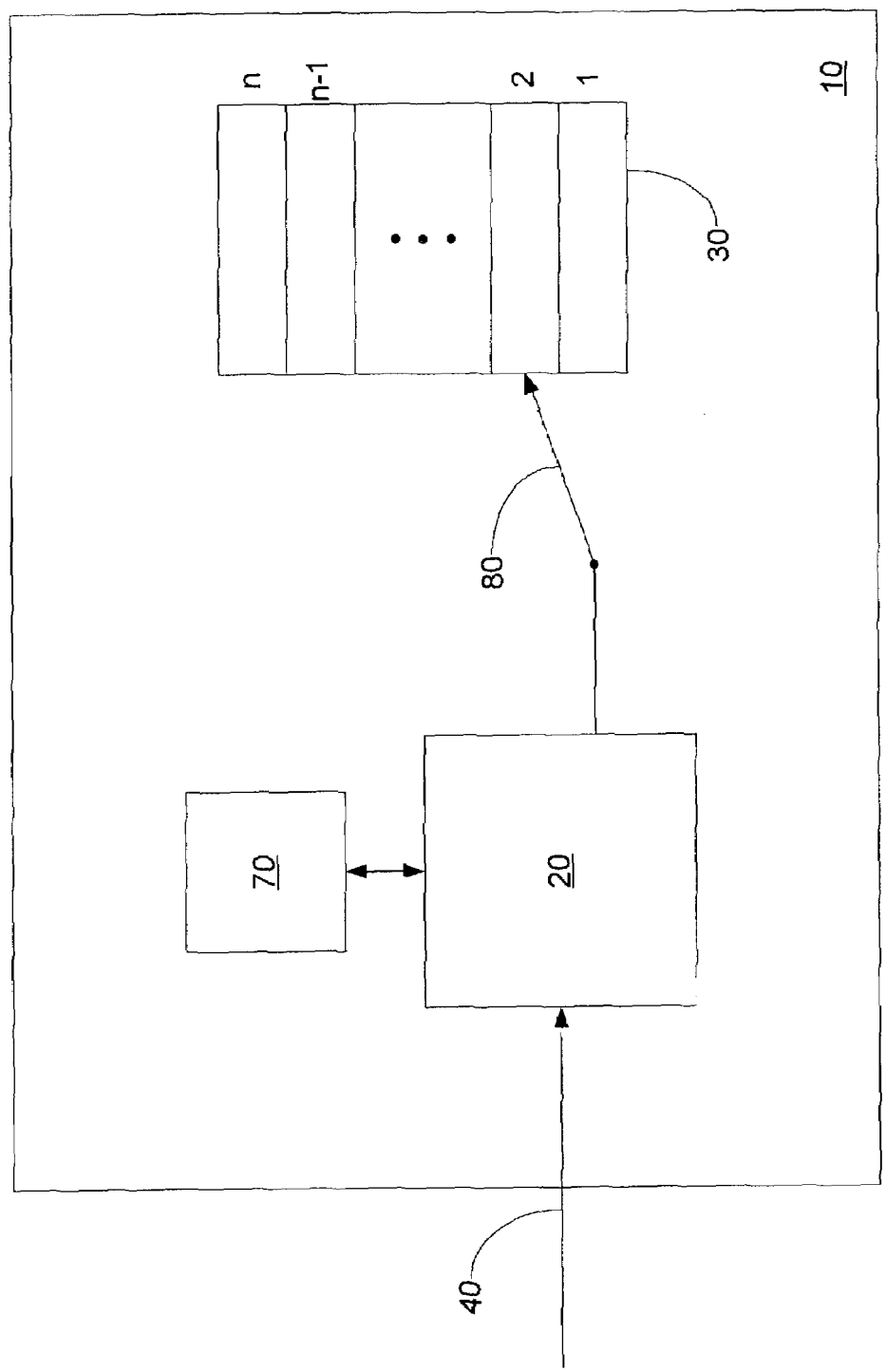
FIG. 2 shows a representation illustrating an embodiment of a system that sets up a connection to a software layer according to the present invention.
Figure 3:
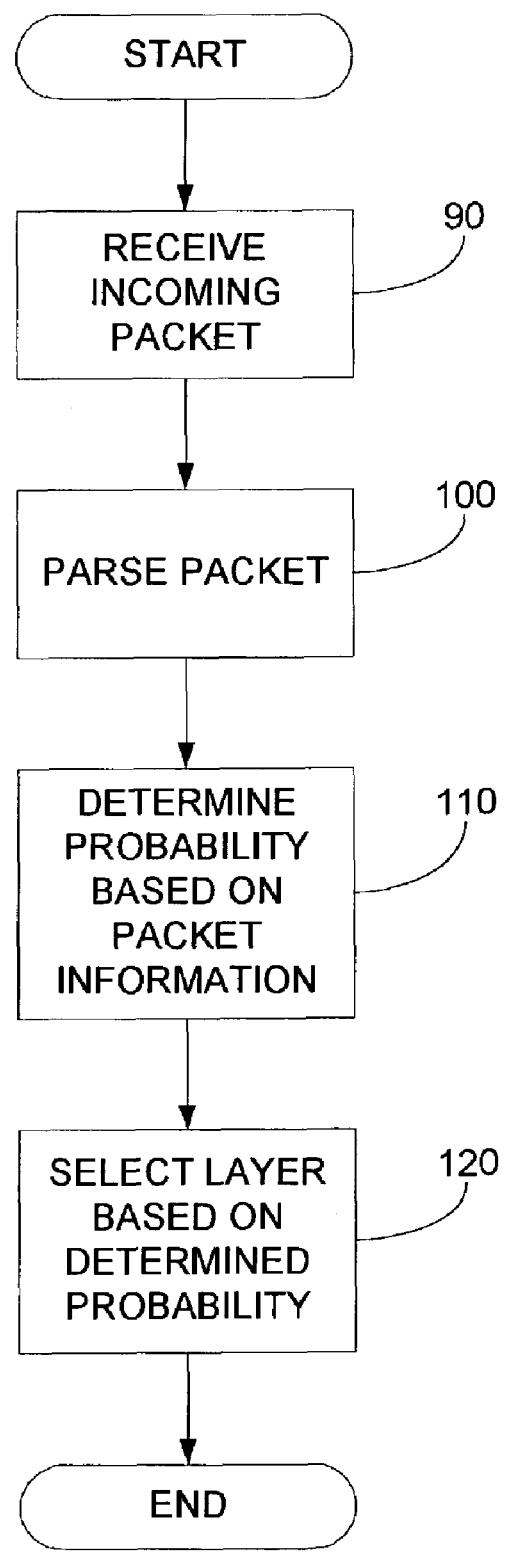
FIG. 3 shows a flowchart illustrating an embodiment of a process that sets up a connection to a software layer according to the present invention.

FIG. 2 shows an embodiment of a system and FIG. 3 shows a flowchart illustrating an embodiment of a process that sets up a connection to a software layer according to the present invention. FIG. 2 includes many similar components as described above and as illustrated in FIG. 1 that are not further described herein. The system 10 may further include a heuristic module 70 that is coupled to the hardware module 20. The present invention may also provide different degrees of integration between all or some of the components described herein. For example, the heuristic module 70 and the hardware module 20 may be integrated within a single module.

In operation, in step 90, the incoming information packet 40 is received, for example, by the system 10 via the hardware module 20. In step 100, the received data packet 40 is parsed by the hardware module 20. In one example, the parsing may include filtering or processing of the received data packet 40. In another example, at least some parts of the incoming data packet 40 are sent to the heuristic module 70. In step 110, the heuristic module 70 uses the information from the incoming information packet (e.g., internet protocol information, transmission control protocol information, socket information, port information, source or destination information, data information, combinations thereof, etc.) in making a probabilistic estimate as to which of the software layers is most likely to be appropriate for connection. In one example, the heuristic module 70 generates a list of probable layer selections as determined, for example, by a programmable threshold (e.g., a threshold probability) or other parameters (e.g., the length of the list) or the IP address of the sender and/or the TCP port of the sender and/or the destination TCP port requested by the sender. In step 120, the heuristic module 70 selects the layer with the highest probability of being the appropriate layer. The heuristic module 70 then forwards this information to the hardware module 20. The hardware module 20 tests the layer selected by the heuristic module 70 via a path 80 to see if it is the appropriate layer. If it is the appropriate layer, then the connection is made with the layer and the information packet 40 is routed to the layer. If it is not the appropriate layer, then the testing of layers occurs as illustrated in FIG. 1 and described above. Alternatively, the heuristic module 70 may select the next most likely layer for the given information received from the parsed information packet 40 via the hardware module 20. In one example, the heuristic module 70 may select the next most likely layer from the generated list of probable layer selections.

Figure 4A:
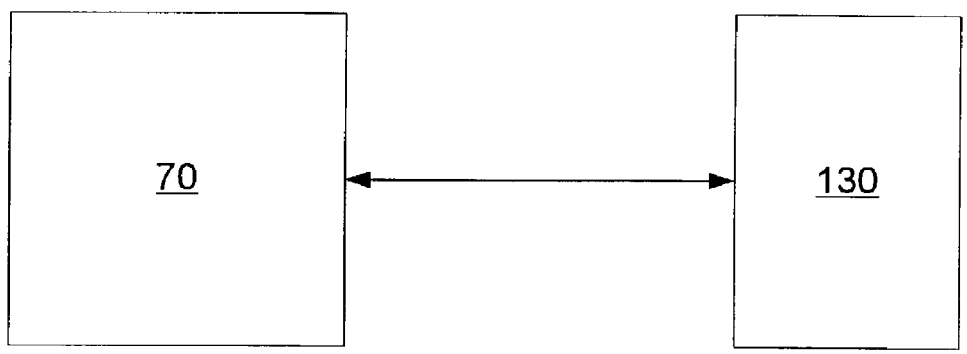
FIG. 4A shows a block representation illustrating an embodiment of a look-up table according to the present invention.
Figure 4B:
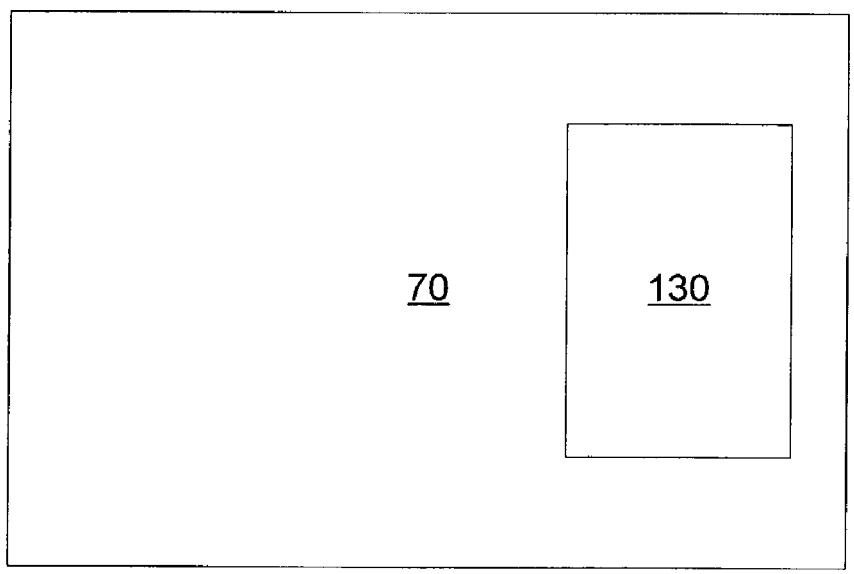
FIG. 4B shows a block representation illustrating an embodiment of a look-up table according to the present invention.

The heuristic module 70 may be structured such that, using the parsed information provided by the hardware module 20, the heuristic module 70 can look up the most likely requested layer via, for example, a look-up table 130. The look-up table 130 may be a separate module, which is coupled to the heuristic module 70 as illustrated in FIG. 4A, or may be part of the heuristic module 70 as illustrated in FIG. 4B. The look-up table 130 may reflect initial or default layer connection assumptions or may reflect empirical data gained through previous connection processes. Alternatively, the heuristic module 70 may calculate probabilities using known or learned algorithms. Furthermore, the look-up table 130 or the calculations may change as the heuristic module 70 adjusts the premises, strategies or empirical data for determining its probabilities based upon its experiences.

Thus, it is seen that systems and methods that provide receiver-aided set-up request routing are provided. One skilled in the art will appreciate that the present invention can be practiced by other than the preferred embodiments which are presented in this description for purposes of illustration and not of limitation, and that the present invention is limited only by the claims that follow. It is noted that equivalents for the particular embodiments discussed in this description may practice the present invention as well.

What is claimed is:

1. A method for setting up a connection to a software layer, the method comprising:
   receiving an incoming packet;
   parsing the received packet;
   determining a probability that a particular software layer is likely to be a software layer to which the incoming packet is to be connected as a function of information from at least a portion of the parsed packet;
   selecting the software layer with the highest determined probability; and
   testing the selected software layer to determine whether the selected software layer is the software layer to which the incoming packet should be connected.

2. The method according to claim 1, wherein receiving an incoming packet comprises receiving the incoming packet via a hardware module.

3. The method according to claim 2, wherein the hardware module is adapted to route the incoming packet to the selected and tested software layer.

4. The method according to claim 1, wherein parsing the received packet comprises filtiring the received packet.

5. The method according to claim 1, wherein the information from at least a portion of the parsed packet comprises one or both of internet protocol information and transmission control protocol information.

6. The method according to claim 1, further comprising generating a list of probable software layer selections.

7. The method according to claim 1, further comprising after selecting the software layer, sending information of the selected software layer to a hardware module to perform the testing.

8. The method according to claim 1, further comprising if the tested software layer is not the software layer to which the incoming packet should be connected, then selecting and testing a next most likely software layer.

9. The method according to claim 1, wherein selecting the software layer comprises using the information from at least a portion of the parsed packet to look up a most likely software layer in a look-up table.

10. The method according to claim 9, wherein the look-up table is adapted to reflect initial connection assumptions or default layer connection assumptions.

11. The method according to claim 9, wherein the look-up table is adapted to reflect empirical data gained through previous connection processes.

12. The method according to claim 1, wherein determining thea probability that a particular software layer is likely to be a software layer to which the incoming packet is to be connected is a function of information that changes based upon previous experiences.

13. The method according to claim 1, wherein determining a probability that a particular software layer is likely to be a software layer to which the incoming packet is to be connected is a function of heuristic learning.

14. The method according to claim 1, wherein the information from at least a portion of the parsed packet comprises one or both of socket information and port information.

15. The method according to claim 1, wherein the information from at least a portion of the parsed packet comprises one or both of source information and destination information.

16. The method according to claim 1, wherein the information from at least a portion of the parsed packet comprises data information.

17. The method according to claim 1, further comprising, if it is determined that the selected software layer is the software layer to which the incoming packet should be connected, then routing the incoming packet to the selected software layer.

18. A system for setting up a connection to a software layer, the system comprising:
 at least one module adapted to, at least:
  receive an incoming packet;
  parse the received packet;
  determine a probability that a particular software layer is likely to be a software layer to which the incoming packet is to be connected as a function of information from at least a portion of the parsed packet;
  select the software layer with the highest determined probability; and
  test the selected software layer to determine whether the selected software layer is the software layer to which the incoming packet should be connected.

19. The system according to claim 18, wherein the at least one module is further adapted to, if it is determined that the selected software layer is the software layer to which the incoming packet should be connected, route the incoming packet to the selected software layer.

20. The system according to claim 18, wherein the at least one module is further adapted to, if the tested software layer is determined not to be the software layer to which the incoming packet should be connected, select and test a next most likely software layer to determine whether the next most likely software layer is the software layer to which the incoming packet should be connected.

21. The system according to claim 18, wherein the at least one module is adapted to select the software layer with the highest determined probability by, at least in part, using the information from at least a portion of the parsed packet to look up a most likely software layer in a look-up table.

22. The system according to claim 18, wherein the at least one module is adapted to determine a probability that a particular software layer is likely to be a software layer to which the incoming packet is to be connected as a function of information that changes based upon previous experiences.

23. The system according to claim 18, wherein the at least one module comprises a hardware module.

\* \* \* \* \*